(12) United States Patent
Dhanabalan et al.

(10) Patent No.: US 11,745,477 B2
(45) Date of Patent: Sep. 5, 2023

(54) POLYOLEFIN BASED MULTILAYER FILM WITH A HYBRID BARRIER LAYER

(71) Applicant: SABIC GLOBAL TECHNOLOGIES B.V., Bergen op Zoom (NL)

(72) Inventors: Anantharaman Dhanabalan, Geleen (NL); Mohamed Ashraf Moideen, Geleen (NL); Venkata Ramanarayanan Ganapathy Bhotla, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/284,308

(22) PCT Filed: Oct. 4, 2019

(86) PCT No.: PCT/EP2019/076880
§ 371 (c)(1),
(2) Date: Apr. 9, 2021

(87) PCT Pub. No.: WO2020/074378
PCT Pub. Date: Apr. 16, 2020

(65) Prior Publication Data
US 2021/0379874 A1   Dec. 9, 2021

(30) Foreign Application Priority Data
Oct. 11, 2018   (IN) .............................. 201841038628

(51) Int. Cl.
*B32B 27/08*   (2006.01)
*B32B 7/12*   (2006.01)
(Continued)

(52) U.S. Cl.
CPC ................ *B32B 27/08* (2013.01); *B32B 7/12* (2013.01); *B32B 27/16* (2013.01); *B32B 27/283* (2013.01);
(Continued)

(58) Field of Classification Search
CPC ............ B32B 2250/02; B32B 2250/03; B32B 2250/04; B32B 2250/05; B32B 2250/24;
(Continued)

(56) References Cited

U.S. PATENT DOCUMENTS 5,981,029 A   11/1999   Harada et al.
7,393,581 B2   7/2008   Kim et al.
(Continued)

OTHER PUBLICATIONS

Butler, "Film Extrusion Manual" 2nd Edition; 2005; pp. 413-435.
(Continued)

*Primary Examiner* — Lawrence D Ferguson
(74) *Attorney, Agent, or Firm* — CANTOR COLBURN LLP (57) ABSTRACT

A multilayer film that includes at least a first polymeric layer comprising a polyolefin-based polymer and a second polymeric layer comprising a blend of a polar polymer and a silicon (Si) containing material comprising a silane having at least one alkyl group having at least 6 carbon atoms (C6) is disclosed. Methods of using and making the multilayer film is also disclosed.

18 Claims, 1 Drawing Sheet

(51) Int. Cl.
  *B32B 27/16* (2006.01)
  *B32B 27/28* (2006.01)
  *B32B 27/30* (2006.01)
  *B32B 27/32* (2006.01)
  *B32B 27/34* (2006.01)

(52) U.S. Cl.
  CPC .......... *B32B 27/304* (2013.01); *B32B 27/306* (2013.01); *B32B 27/32* (2013.01); *B32B 27/34* (2013.01); *B32B 2250/24* (2013.01); *B32B 2250/40* (2013.01); *B32B 2270/00* (2013.01); *B32B 2307/7244* (2013.01); *B32B 2307/7246* (2013.01); *B32B 2307/732* (2013.01); *B32B 2439/46* (2013.01); *B32B 2439/70* (2013.01)

(58) Field of Classification Search
  CPC ............ B32B 2250/40; B32B 2270/00; B32B 2307/546; B32B 2307/724; B32B 2307/7244; B32B 2307/7246; B32B 2307/73; B32B 2307/732; B32B 2307/738; B32B 2439/06; B32B 2439/46; B32B 2439/70; B32B 2439/80; B32B 2535/00; B32B 2556/00; B32B 27/08; B32B 27/16; B32B 27/18; B32B 27/28; B32B 27/283; B32B 27/30; B32B 27/304; B32B 27/306; B32B 27/32; B32B 27/327; B32B 27/34; B32B 7/05; B32B 7/12
  See application file for complete search history.

(56) References Cited

U.S. PATENT DOCUMENTS

| | | |
|---|---|---|
| 2004/0058157 A1 | 3/2004 | Ishikawa |
| 2010/0112315 A1* | 5/2010 | Song .......................... C08J 7/06 |
| | | 156/60 |
| 2010/0136350 A1 | 6/2010 | Inaba et al. |
| 2010/0285319 A1 | 11/2010 | Kwak et al. |
| 2011/0123056 A1 | 5/2011 | Aboulnasr et al. |
| 2011/0195259 A1 | 8/2011 | Song |
| 2011/0250441 A1 | 10/2011 | Amberg-Schwab et al. |
| 2014/0087162 A1 | 3/2014 | Ma et al. |
| 2014/0141262 A1 | 5/2014 | Castle et al. |

OTHER PUBLICATIONS

International Search Report for International Application No. PCT/EP2019/076880, International Filing Date Oct. 4, 2019, dated Dec. 10, 2019, 5 pages.
Written Opinion for International Application No. PCT/EP2019/076880, International Filing Date Oct. 4, 2019, dated Dec. 10, 2019, 6 pages.

* cited by examiner

POLYOLEFIN BASED MULTILAYER FILM WITH A HYBRID BARRIER LAYER

CROSS REFERENCE TO RELATED APPLICATIONS

This application is a National Stage application of PCT/EP2019/076880, filed Oct. 4, 2019, which claims the benefit of Indian Application No. 201841038628, filed Oct. 11, 2018, both of which are incorporated by reference in their entirety herein.

BACKGROUND OF THE INVENTION

A. Field of the Invention

The invention generally concerns multilayer barrier films that include a polyolefin-based water vapor barrier layers and a gas barrier polymeric layer comprising a blend of a polar polymer and a silicon (Si) containing material with alkyl chain-containing silanes. The multilayer films can be prepared by co-extrusion and/or lamination of water vapor barrier layers with gas barrier layers without the need for surface pre-treatments or adherent (tie) layers.

B. Description of Related Art

Food packaging is important in the global food supply chain. It helps to reduce food degradation by reducing exposure of the food to water vapor and/or oxygen. This allows for extended shipping and/or storage periods and provides for a longer shelf-life stability of the food.

Food packaging typically relies on polymeric packaging films. These packaging films generally consist of a low oxygen transmission rate (OTR) layer of either organic polymer (e.g., polyethylene vinyl alcohol (EVOH), polyvinyl alcohol (PVOH), polyvinylidene chloride (PVDC), polyamide (PA) (semi-crystalline and/or amorphous nylon), or inorganic materials (pre-formed and/or in-situ formed metal oxides). Such packaging films are often exposed to high humidity conditions during use (e.g., food storage under refrigerated and/or wet sterilization conditions). However, the performance of low OTR polymers (e.g., EVOH, PVOH) deteriorates upon exposure to a high humidity environment. Thus, low OTR polymer layers are often interposed between layers of low water vapor transmission rate (WVTR) organic polymers (e.g., polyethylene, polypropylene). Since many low WVTR materials are poor oxygen barriers, multiple interposed layers are often arranged into multilayer packaging films to prevent accelerated degradation of food items by oxygen and moisture exposure. As these low OTR and low WVTR materials are typically polar and non-polar respectively, interfacial adhesion between them is typically achieved via surface pre-treatment or adherent (tie) layers.

Currently available food packaging often relies on multilayer barrier films that have organic-inorganic hybrid layers. By way of example, U.S. Pat. No. 7,393,581 to Kim et al. describes a multilayer barrier film prepared by coating a plastic film (e.g., a cyclic polyolefin) with a sol gel of a buffer composition and curing to form an organic-inorganic hybrid buffer layer. The buffer composition comprises an organic silane, a metal alkoxide, and a filler such as silica. Further inorganic oxide layers are prepared by vapor deposition, while further buffer layers are prepared by sol gel coating and curing. An acryl primer coating is used to provide adhesion between the plastic film and the buffer layer. Further, adherent (tie) layers are used to attach multilayer structures together.

In another example, U.S. Patent Application Publication No. 2010/0285319 to Kwak et al. describes a multilayer barrier film prepared by coating a plastic film (e.g., cyclic polyolefin) with a sol gel composition and curing to form an organic-inorganic hybrid layer. The sol gel composition comprises a siloxane and an alkoxysilane. Further inorganic layers are deposited on the organic-inorganic hybrid layer by plasma treatment with reactive gas. Plasma pretreatment is used to improve the adhesion between the plastic film and the organic-inorganic layer.

In U.S. Patent Application Publication No. 2011/0250441 to Amberg-Schwab et al., a multilayer barrier film is prepared by vapor deposition of a first inorganic coating such as silicon oxide or aluminum oxide onto a plastic layer (e.g., polyethylene terephthalate (PET)). The inorganic layer is further coated with a sol-gel composition and cured to form an organic-inorganic hybrid polymer layer. The sol-gel composition comprises a reactive organic silane such as epoxy, acrylate, methacrylate, or vinyl functional silane. A further inorganic layer is vapor deposited onto the organic-inorganic hybrid polymer layer. This multilayer film requires multiple coating, curing, and vapor deposition steps.

WO/International Application Publication No. 2011/123056 to Xu et al. describes a multilayer barrier film prepared by coating a polyolefin film with a sol gel composition and curing to form an organic-inorganic hybrid polymer layer. The sol gel composition comprises an organic silane (e.g., epoxy functional silane), a silicate, and a hydroxyfunctional polymer (e.g., EVOH). A further polyolefin layer is laminated onto the organic-inorganic hybrid polymer layer. A laminatable polyolefin film is pre-coated with a thermal sensitive adhesive to adhere multiple layers together to create a multilayer film.

U.S. Application Publication No. 2014/0141262 to Castle et al. describes a multilayer barrier film prepared by coating a polyolefin film with an aqueous coating composition and curing to form an organic-inorganic hybrid polymer layer. The coating composition includes the reaction product of an aminosilane and/or aminosilanol with a ketoester-functionalized homopolymer or copolymer of vinyl alcohol (e.g., EVOH). A further polyolefin layer is laminated onto the organic-inorganic hybrid polymer layer. Plasma pretreatment is used to improve the adhesion between the plastic film and the organic-inorganic layer.

U.S. Pat. No. 5,981,029 to Harada et al. describes a multilayer barrier film prepared by coating a polyolefin film with an aqueous coating composition and curing to form an organic-inorganic hybrid polymer layer. The coating composition includes an aminosilane, a water soluble polymer (e.g., PVOH), and an inorganic particle (e.g., clay). Plasma pretreatment is used to improve the adhesion between the polyolefin film and the organic-inorganic layer.

U.S. Application Publication No. 2004/0058157 to Ishikawa describes a multilayer barrier film prepared by coating a plastic film (e.g., cyclic polyolefin) with a sol-gel composition and curing to form an organic-inorganic hybrid polymer layer. The sol-gel composition includes the polycondensation product of an alkoxy silane and a hydroxyfunctional polymer (e.g., EVOH). Corona pretreatment is used to improve the adhesion between the plastic film and the organic-inorganic layer.

As illustrated above, the currently available organic-inorganic hybrid and hybrid polymer layers used for packaging typically use surface pre-treatment (e.g., plasma or corona treatment) and/or adherent (tie) layers to form multilayer barrier films. Further, preparation of these multilayer barrier films tend to rely on several processing steps (e.g., multiple coatings, curing steps, and reactive plasma treatment steps), all of which can be detrimental for commercial use from a cost and process complexity perspective.

SUMMARY OF THE INVENTION

A discovery has been made that provides a solution to at least some of the aforementioned problems and inefficiencies associated with preparing acceptable multi-layer films that can be used in the food packaging industry. The discovery is premised on a polymeric layer that has a low oxygen transmission rate (OTR) and that has sufficient adhesion properties to additional layers (e.g., polyolefin-based polymer layers) such that adherent tie-layers and/or surface pretreatment (e.g., plasma or corona treatment) do not have to be used on the low OTR layer or on the additional layers. In particular, the low OTR layer comprises a blend of a polar polymer and a silicon (Si) containing material comprising a silane having at least one alkyl group having at least 6 carbon atoms (C6), preferably 6 to 20 carbon atoms. Even further, the blend of the polar polymer and the Si containing material along with polyolefin-based polymers are extrudable, compression moldable, or can be laminated. This allows for a cost and time efficient process for making multi-layered barrier films by using typical multilayer extrusion and/or molding processes rather than relying on the more costly and complex coating steps, curing steps, and pre- and post-treatments.

In one aspect of the present invention, a multilayer film is disclosed. The multilayer film can include at least a first polymeric layer that includes a polyolefin-based polymer, and a second polymeric layer that includes a blend of a polar polymer and a silicon (Si) containing material that includes a silane having at least one alkyl group having at least 6 carbon atoms (C6). In a preferred aspect, the alkyl group has 6 to 20 carbon atoms. In certain aspects, at least a portion of the surface of the first polymeric layer is in direct contact with and attached to at least a portion of a surface of the second polymeric layer, and an adherent (tie) layer is not positioned between these surfaces. In another aspect, an adherent (tie) layer can be positioned between these surfaces. In one aspect, the first and the second polymer layer have not been plasma treated or corona treated to increase adhesion between the layers. In another aspect, the first and/or second polymer layer(s) can be plasma or corona treated to increase adhesion between the layers. In one aspect, a metal oxide or $SiO_2$ is not coated or deposited on the first and/or second polymeric layers. The Si containing material of the second polymeric layer can be a mixture of the silane and a silylated polar polymer. The silane can have a general formula of $SiR^1R^2R^3R^4$, where $R^1$ is the alkyl group having at least 6 carbon atoms, and $R^2$, $R^3$ and $R^4$ are each independently a C1 to C5 alkoxy group or alkyl group, with the proviso that at least one of $R^2$, $R^3$ and $R^4$ is an alkoxy group. Non-limiting examples of silanes are disclosed throughout the specification and incorporated into this section by reference. Some preferred silanes include dimethoxymethyloctylsilane, dimethoxymethyloctadecylsilane, decyldimethoxymethylsilane, dodecyldimethoxymethylsilane, cyclohexyldimethoxymethylsilane, octyltrimethoxysilane, decyltrimethoxysilane, dodecyltrimethoxysilane, octadecyltrimethoxysilane, cyclohexyltrimethoxysilane, diethoxymethyloctadecylsilane, cyclohexyldiethoxymethylsilane, cyclohexyltriethoxysilane, octyltriethoxysilane, decyldiethoxymethylsilane, dodecyldiethoxymethylsilane, octadecyltriethoxysilane and decyltriethoxysilane. In some embodiments, the silane is an oligomeric alkyl silane. The silane may for example be dimethoxymethyloctylsilane.

The second polymeric layer of the multilayered film can have a thickness of up to 10 micrometers (e.g., 0.1, 0.5, 1, 2, 3, 4, 5, 6, 7, 8, 9, or 10 micrometers, or any range therein). In a preferred embodiment, the thickness is 1 to 5 micrometers. The second polymeric layer can have an oxygen transmission rate (OTR) of 0.1 to 30 $cc/m^2/day$ at 0% relative humidity and room temperature (e.g., 20° C. to 30° C.). The second polymeric layer can have an oxygen transmission rate (OTR) of 1 to 50 $cc/m^2/day$ at 75% to 100% relative humidity and room temperature. The second polymeric layer can have a water contact angle of 90 to 110 degrees. The second polymeric layer can also include silica ($SiO_2$), amino functional silane, and/or an epoxy functional silane dispersed in the second layer.

In another aspect of the present invention, the multilayer film can include a third polymeric layer. This third layer can include a polyolefin-based polymer and can be different or the same as the first layer. The third layer can be in direct contact with and attached to at least a portion of a surface of the second polymeric layer. In a preferred aspect, the second layer can be positioned at least partially between the first and third layers, thereby creating a stack of layers (e.g., first layer on top, second layer positioned below first layer, and third layer positioned below second layer). It is also contemplated, in the context of the present invention, that additional layers can be positioned above and below the first and third layers. In an alternative embodiment, adherent layers can be used such that the stack of layers can include the first layer, a first adherent layer positioned below the first layer, the second layer positioned below the first adherent layer, a second adherent layer positioned below the second layer, and the third layer positioned below the second adherent layer. In a preferred aspect, adherent layers are not used and the surfaces of the first and second and third layers are not pretreated with plasma or corona treatment and the first layer, third layer, or both can include a homopolymer of polyethylene (e.g., high density polyethylene, a linear low density polyethylene, an ultra-low density polyethylene, a maleic anhydride grafted polyolefin, copolymers thereof, or blends thereof, preferably a polyethylene or maleic anhydride grafted polyethylene).

Also disclosed in the context of the present invention is a process for making the multilayer film of the present invention. The process can include attaching a polyolefin-based polymer layer with a layer of a polymer blend that includes a second polar polymer and silane containing material under conditions to form the multilayer film. These polymer layers can be produced through extrusion techniques. In some instances, each film can be extruded to form films and each layer can be pressed together through compression molding, heat pressed, or laminated to form the multilayer film of the present invention.

In the context of the present invention 20 embodiments are disclosed. Embodiment 1 is a multilayer film comprising: (a) at least a first polymeric layer comprising a polyolefin-based polymer; and (b) a second polymeric layer comprising a blend of a polar polymer and a silicon (Si) containing material comprising a silane having at least one alkyl group having at least 6 carbon atoms (C6). Embodiment 2 is the multilayer film of embodiment 1, wherein at least a portion of the surface of the first polymeric layer is in direct contact with and attached to at least a portion of a surface of the second polymeric layer. Embodiment 3 is the multilayer film of embodiment 1, wherein an adherent layer is positioned between at least a portion of the first and second polymeric layers. Embodiment 4 is the multilayer film of any one of embodiments 1 to 3, wherein the first polymeric layer has a non-plasma treated or non-corona treated surface. Embodiment 5 is the multilayer film of any one of embodiment 1 to 4, wherein the Si containing material is a silane or an oligomeric silane, or a mixture of the silane(s) and a silylated polar polymer. Embodiment 6 is the multilayer film of any one of embodiments 1 to 5, wherein the silane has a general formula of $SiR^1R^2R^3R^4$, where $R^1$ is the alkyl group having at least 6 carbon atoms, and $R^2$, $R^3$ and $R^4$ are each independently a C1 to C5 alkoxy group or alkyl group with the proviso that at least one of $R^2$, $R^3$ and $R^4$ is an alkoxy group. Embodiment 7 is the multilayer film of embodiment 6, wherein the silane is dimethoxymethyloctylsilane, dimethoxymethyloctadecylsilane, decyldimethoxymethylsilane, dodecyldimethoxymethylsilane, cyclohexyldimethoxymethylsilane, octyltrimethoxysilane, decyltrimethoxysilane, dodecyltrimethoxysilane, octadecyltrimethoxysilane, cyclohexyltrimethoxysilane, diethoxymethyloctadecylsilane, cyclohexyldiethoxymethylsilane, cyclohexyltriethoxysilane, octyltriethoxysilane, decyldiethoxymethylsilane, dodecyldiethoxymethylsilane, octadecyltriethoxysilane and decyltriethoxysilane. Embodiment 8 is the multilayer film of any one of embodiment 1 to 7, wherein the second polymeric layer has a thickness of up to 10 micrometers, preferably 1 to 5 micrometers. Embodiment 9 is the multilayer film of any one of embodiments 1 to 8, wherein the second polymeric layer has an oxygen transmission rate (OTR) of 0.1 to 30 cc/m$^2$/day at 0% relative humidity and room temperature. Embodiment 10 is the multilayer film of any one of embodiments 1 to 9, wherein the second polymeric layer has an oxygen transmission rate (OTR) of 1 to 50 cc/m$^2$/day at 75% to 100% relative humidity and room temperature. Embodiment 11 is The multilayer film of any one of embodiments 1 to 10, wherein the second polymeric layer has water contact angle of 90 to 110 degrees. Embodiment 12 is the multilayer film of any one of embodiments 1 to 2 and 4 to 11, wherein an adherent layer is not positioned between the first and second polymeric layers and/or a metal oxide or $SiO_2$ is not coated or deposited on the first and/or second polymeric layer. Embodiment 13 is the multilayer film of any one of embodiments 1 to 12, further comprising a third polymeric layer comprising a polyolefin-based polymer, wherein the third polymeric layer is in direct contact with and attached to at least a portion of a surface of the second polymeric layer, and wherein at least a portion of the second polymeric layer is positioned between the first and third polymeric layers. Embodiment 14 is the multilayer film of any one of embodiments 1 to 13, further comprising silica ($SiO_2$), amino functional silane, and epoxy functional silane dispersed in the second layer. Embodiment 15 is the multilayer film of any one of embodiments 1 to 14, wherein the polar polymer in the second polymeric layer is a polyvinyl alcohol (PVOH), ethylvinyl alcohol (EVOH), polyamide (PA), polyvinylidene chloride (PVDC), or copolymers thereof, or blends thereof. Embodiment 16 is the multilayer film of any one of embodiments 13 to 15, wherein the first, second, and third polymeric layers are melt extruded polymeric layers. Embodiment 17 is the multilayer film of any one of embodiments 13 to 16, wherein the overall thickness of the multilayer film is 60 micrometers or less and/or wherein the first polymeric layer, the third polymeric layer, or both polymeric layers have a thickness of 10 micrometers to 30 micrometers, preferably 15 micrometers to 25 micrometers each, the second polymeric layer has a thickness of 2 micrometers to 10 micrometers, preferably 3 micrometers to 6 micrometers, or both. Embodiment 18 is the multilayer film of any one of embodiments 13 to 17, wherein the first layer, third layer, or both comprise a homopolymer of polyethylene that includes a high density polyethylene, a linear low density polyethylene, an ultra low density polyethylene, a maleic anhydride grafted polyolefin, copolymers thereof, or blends thereof, preferably a polyethylene or maleic anhydride grafted polyethylene. Embodiment 19 is a food-package comprising the multilayer film of any one of embodiments 1 to 18. Embodiment 20 is a process to produce the multilayer film of any one of embodiments 1 to 18, the process comprising attaching a polyolefin-based polymer layer with a layer of a mixture comprising a second polar polymer and silane containing material under conditions to form the multilayer film of any one of embodiments 1 to 18.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions of the invention can be used to achieve methods of the invention.

The following includes definitions of various terms and phrases used throughout this specification.

The term "alkyl group" means straight or branched chain alkyl having 1 to 20 carbon atoms and includes, for example, methyl, ethyl, n-propyl, isopropyl, n-butyl, isobutyl, sec-butyl, tert-butyl, 1-pentyl, 2-pentyl, 3-pentyl, 3-methyl-1-butyl, 2-methyl-1-butyl, 2,2-dimethyl-1-propyl, 3-methyl-2-butyl, 2-methyl-2-butyl, 1-hexyl, 2-hexyl, 3-hexyl, octyl, nonyl, decyl, undecyl, dodecyl, tridecyl, tetradecyl, pentadecyl, hexadecyl, heptadecyl, octadecyl, nonadecyl, and icosyl.

The term "substituted alkyl group" can include any of the aforementioned alkyl groups that are additionally substituted with one or more heteroatom, such as a halogen (F, Cl, Br, I), oxygen, nitrogen, sulfur, phosphorous, etc. Without limitation, a substituted alkyl group can include alkoxy, or alkylamine, which includes mono- or di-substituted alkyl and/or substituted alkyl chains mentioned above attached to the nitrogen atom of the amine.

The term "alkoxy" includes a group having the structure —OR, where R is an alkyl group. Non-limiting examples of alkoxy groups include —OCH$_3$, —OCH$_2$CH$_3$, —OCH$_2$CH$_2$CH$_3$, —OCH(CH$_3$)$_2$, —OCH(CH$_2$CH$_3$)$_2$, —OC(CH$_3$)$_3$, etc.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 50%, within 1%, or within 0.50%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The multilayer films and methods of making the films of the present invention can "comprise," "consist essentially of," or "consist of" particular ingredients, components, compositions, steps, etc., disclosed throughout the specification. With respect to the transitional phase "consisting essentially of," in one non-limiting aspect, a basic and novel characteristic of the multilayer films of the present invention is the presence of the polymeric layer comprising a blend of a polar polymer and a silicon (Si) containing material comprising a silane having at least one alkyl group having at least 6 carbon atoms (C6) and its attachment to polyolefin-based polymeric layer(s). This combination can produce a multilayer film that has low OTR and low WVTR characteristics. The attachment between these layers can be obtained without the use of a tie layer and without plasma or corona pretreatment of the surfaces of the layers.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

While the invention is susceptible to various modifications and alternative forms, specific embodiments thereof are shown by way of example in the drawings. The drawings may not be to scale.

DETAILED DESCRIPTION OF THE INVENTION

The use of plastic films to make packaging materials for foods is widely known. The flexibility of these films allows for their use in preparing bags, wrappers, pouches, and other thermoformed materials. The permeability of these plastic films to gases (especially oxygen) and moisture is a key consideration during the design of a suitable food package. As discussed above, the currently available organic-inorganic hybrid and hybrid polymer layers used for food packaging typically use surface pre-treatment (e.g., plasma or corona treatment) and/or adhesive (tie) layers to form multilayer barrier films. These processes also rely on several processing steps (e.g., multiple coatings, curing steps, and reactive plasma treatment steps) to produce the packaging material.

The present invention provides a solution to at least some of the aforementioned problems and inefficiencies seen with current packaging materials. The solution resides in the discovery of a polymeric layer that has a low oxygen transmission rate (OTR) and that has sufficient adhesion properties to additional layers (e.g., polyolefin-based polymer layers) such that adhesive tie-layers and/or surface pretreatment (e.g., plasma or corona treatment) do not have to be used on the low OTR layer or on the additional layers. Even further, the multilayer films of the present invention can be made by well-known co-extrusion and/or compression molding techniques rather than the more complicated techniques that oftentimes relay on multiple coating and curing steps. As illustrated in the Examples in a non-limiting manner, this can result in any easy to manufacture multi-layered film suitable for food packaging due to its low OTR and low water vapor transmission rate (WVTR).

These and other non-limiting aspects of the present invention are discussed in further detail in the following sections with reference to the figures.

A. Multilayer Films and Materials Used

Figure 1A:
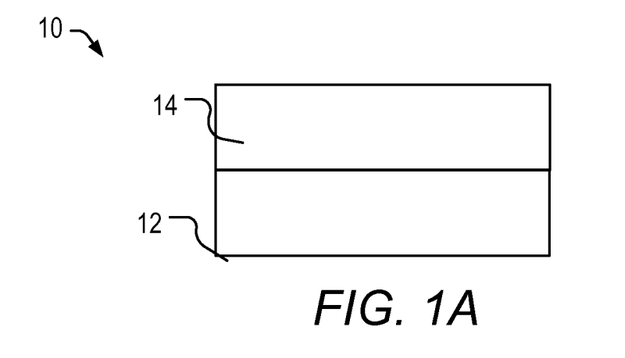
FIGS. 1A and 1B are illustrations of multiple layer films of the present invention that includes (1A) one polyolefin based layer and (1B) two polyolefin based layers in combination with a second polymeric layer having a Si containing material that includes a silane having at least one alkyl group having at least 6 carbon atoms (C6).
Figure 1B:
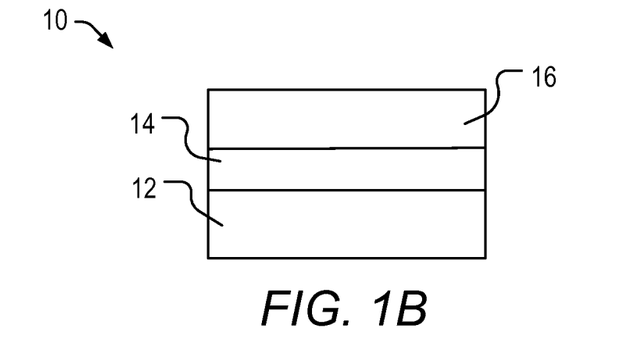

FIGS. 1A and 1B depict illustrations of a multilayer film of the present invention that includes one or more polyolefin layer and a second polymeric layer of the present invention. Referring to FIG. 1A, multilayer film 10 can include polyolefin base polymer layer 12 and second polymeric layer 14. Second polymeric layer 14 includes a blend of a polar polymer and a silicon (Si) containing material polyolefin-based polymer. As shown in FIG. 1B, multilayer film 10 include second polymeric layer 14 positioned between polyolefin based polymer layers 12 and 16.

Figure 2:
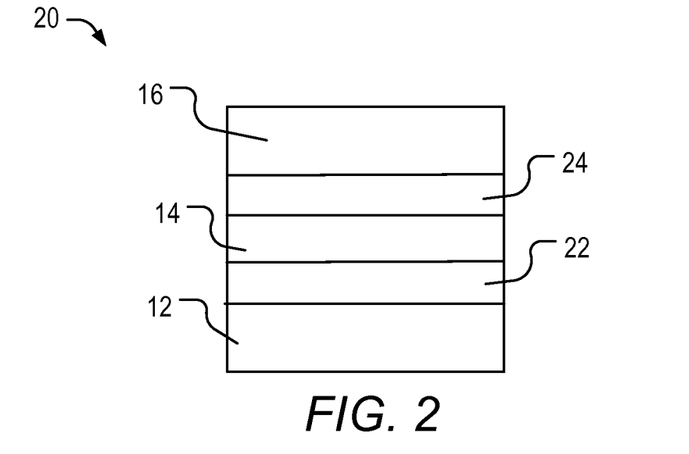
FIG. 2 is an illustration of a multiple layer film of the present invention that includes adherent layers.

FIG. 2 depicts an illustration of a multilayer film of the present invention that includes polyolefin layer(s), the silane containing polar polymer layer, and adherent (tie) layers. In FIG. 2, multilayer film 20 can include polyolefin base polymer layer 12, adherent layer 22, second polymeric layer 14, adherent layer 24, and polyolefin base polymer layer 16.

The layers can be of any thickness. In some embodiments, the overall thickness of the multilayer film(s) 10 and/or 20 is 60 micrometers or less or 1 to 60 micrometers, or less than, equal to, or between any two of 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, and 1. In some embodiment, first polymeric layer 12, third polymeric layer 16, or both polymeric layers have a thickness of 10 micrometers to 30 micrometers, preferably 15 micrometers to 25 micrometers, at least, equal to, or between any two of 10, 11, 12, 13, 14, 15, 16, 17, 18, 19, 20, 21, 22, 23, 24, 25, 26, 27, 28, 29, and 30 micrometers. In some embodiments, second polymeric layer(s) 14 has a thickness of 2 micrometers to 10 micrometers, preferably 3 micrometers to 6 micrometers, or both, or at least, equal to, or between any two of 2, 3, 4, 5, 6, 7, 8, 9, and 10 micrometers. In one embodiment, first and third polymeric layers (14, 16) have a thickness of 10 to 30 micrometers and second polymeric layer 14 has a thickness of 2 to 10 micrometers. In embodiments were adherent layer(s) 22 and 24 are included in the film, the thickness of the adherent layer(s) 22 and 24 can be at least, equal to, or between any two of 2, 3, 4, 5, 6, 7, 8, 9, and 10 micrometers.

1. Polymeric Layer with a Polyolefin-Based Polymer

The polymeric layer that include the polyolefin-based polymer (e.g., layers 12 and 16 of FIGS. 1 and 2) can include polymeric olefin material. The polyolefin based layer(s) can be the same or different in composition. Polyolefins can include polyethylene, polypropylene, polybutene, copolymers thereof, or blends thereof. Preferred polyolefins are polyethylene and polypropylene, polyethylene copolymers, polyethylene terpolymers, polypropylene copolymers, polypropylene terpolymers, or blends thereof. Non-limiting examples, of polyolefins include a polypropylene copolymer and/or an LLDPE (linear low density polyethylene), etc. A polyethylene copolymer or terpolymer can include a C3-10-alpha-olefin. Non-limiting examples of alpha-olefins includes propylene, 1-butene, 1-pentene, 1-hexene and 1-octene of which butene, hexene and octene are preferred. The amount of comonomer present in the polyethylene copolymer may vary from 0% or 0.1% to 15% by weight, preferably 1% to 10% by weight. The polyolefin based layer(s) can be a mixture of polyethylene polymers, e.g. a mixture of two polymers or three polymers. For example, the polyolefin-based layer can be formed from a mixture of LDPE's, LLDPE's or from the combination of an LLDPE and an LDPE. Polyolefin-based polymers can be produced using a Ziegler-Natta catalyst or single site catalyst (e.g. metallocene catalyst) to a desired properties (e.g., molecular weight distribution, melt flow index, tensile strength, etc.). LLDPE polymers can have a bimodal molecular weight distribution and can be used when packaging operations involve deep drawing and low temperatures. Polyolefins can be obtained from various commercial manufacturers (e.g., SABIC, Saudi Arabia) under the tradename of SABIC® SUPEER™ (mPE), SABIC® COHERE™ (POP), SABIC® FORTIFY™ (POE), SABIC® HDPE, SABIC® LDPE, and the like. Commercial polyolefin grades used for food packaging application include LLDPE 6118NSF, LLDPE 6318E, LLDPE 118NE, LLDPE 218BE, LLDPE 318B, LLDPE 8115, LDPE 2201H0, COHERE™ 8102, all available from SABIC®, with SABIC® LLDPE 6118NSF, being preferred.

The polyolefin-based polymer in the first polymeric layer may for example be a polyolefin. For example, the polyolefin-based polymer in the first polymeric layer may be a polymer selected from a polyethylene or a polypropylene. For example, the polyolefin-based polymer in the first polymeric layer may be a polyethylene.

For example, the first polymeric layer may comprise ≥90.0 wt %, preferably ≥95.0 wt %, more preferably ≥98.0 wt %, of a polymer selected from polyethylene and polypropylene, preferably polyethylene. For example, the first polymeric layer may consist of a polymer selected from polyethylene and polypropylene, preferably polyethylene.

For example, where the first polymeric layer comprises or consists of polyethylene, the polyethylene may be a low-density polyethylene, also referred to as LDPE, or a linear low-density polyethylene, which is also referred to as LLDPE. In the context of the present invention, it is to be understood that an LDPE is an ethylene-based homo- or copolymer that is produced via free-radical polymerisation, particularly via high-pressure free-radical polymerisation, such as at pressures of above 200 MPa. It is further to be understood that an LLDPE is an ethylene-based copolymer produced via a catalytic polymerisation process, for example using Ziegler-type catalysts or single-site catalysts such as metallocene-based catalysts. The LLDPE may for example be produced via a gas-phase polymerisation process, a slurry polymerisation process, or a solution-based polymerisation process. The LLDPE may for example comprises moieties derived from a comonomer selected from propylene, 1-butene, 1-hexene, and 1-octene. For example, the LLDPE may for example comprise >0.0 wt % and ≤30.0 wt %, or ≥1.0 and ≤20.0 wt %, or ≥2.0 and ≤15.0 wt %, of moieties derived from a comonomer, preferably selected from propylene, 1-butene, 1-hexene and 1-octene, with regard to the total weight of the LLDPE. The LLDPE may for example have an MFR of ≥0.1 and ≤50.0 g/10 min, or ≥0.2 and ≤20.0, or ≥0.5 and ≤10.0, or ≥0.5 and ≤5.0 g/10 min, wherein MFR is determined as melt mass-flow rate at a load of 2.16 kg, at a temperature of 190° C., according to the method of ISO 1133-1.

The LLDPE may for example have a density of ≥850 and ≤925 kg/m$^3$, preferably ≥880 and ≤925, or ≥900 and ≤925, or ≥905 and ≤920, as determined in accordance with ASTM D792 (2013).

In some embodiments, the first and the second polymer layer have not been plasma treated or corona treated to increase adhesion between the layers. In another aspect, the first and/or second polymer layer(s) can be plasma or corona treated to increase adhesion between the layers. In one aspect, a metal oxide or SiO$_2$ is not coated or deposited on, or dispersed in, the first and/or second polymeric layers.

2. Second Polymeric Layer with a Blend of a Polar Polymer and a Si-Containing Material The Si containing material of the second polymeric layer can be a mixture of the silane and a silylated polar polymer. The second polymeric layer can include 0.1 to 5% silane, or at least, equal to, or between any two of 0.1, 0.5, 1, 1.5, 2, 2.5, 3, 3.5, 4, 4.5, and 5% silane. The silane can have a general formula of $SiR^1R^2R^3R^4$ (structure shown below) where $R^1$ is the alkyl group having at least 6 carbon atoms, and $R^2$, $R^3$ and $R^4$ are each independently a C1 to C5 alkoxy group or alkyl group, with the proviso that at least one of $R^2$, $R^3$ and $R^4$ is an alkoxy group. The silane can have the general structure of:

Non-limiting examples of silanes are disclosed throughout the specification and incorporated into this section by reference. Some preferred silanes include dimethoxymethyloctylsilane, dimethoxymethyloctadecylsilane, decyldimethoxymethylsilane, dodecyldimethoxymethylsilane, cyclohexyldimethoxymethylsilane, octyltrimethoxysilane, decyltrimethoxysilane, dodecyltrimethoxysilane, octadecyltrimethoxysilane, cyclohexyltrimethoxysilane, diethoxymethyloctadecylsilane, cyclohexyldiethoxymethylsilane, cyclohexyltriethoxysilane, octyltriethoxysilane, decyldiethoxymethylsilane, dodecyldiethoxymethylsilane, octadecyltriethoxysilane and decyltriethoxysilane. Non-limiting examples of silanes can also include the oligomeric alkyl silanes. The second polymeric layer can also include silica ($SiO_2$), an amino functional silane, and/or an epoxy functional silane dispersed in the second layer. Some preferred amino functional silanes include 3-aminopropyltrimethoxysilane, 3-aminopropyltriethoxysilane, 3-aminopropylmethyl-dimethoxysilane, 3-aminopropylmethyldiethoxysilane, 2-aminoethyl-3-aminopropyltrimethoxy silane, 2-aminoethyl-3-aminopropyltriethoxy silane, 2-aminoethyl-3-aminopropylmethyldimethoxy silane, 2-aminoethyl-3-aminopropylmethyldiethoxy silane, N-(n-butyl)-3-aminopropyltrimethoxysilane, bis(3-trimethoxysilylpropyl) amine and bis(3-triethoxysilylpropyl) amine. Some preferred epoxy functional silanes include 3-glycidyloxypropyltrimethoxysilane, 3-glycidyloxypropyltriethoxysilane, 2-(3,4-epoxycyclohexyl)ethyltrimethoxysilane and 2-(3,4-epoxycyclohexyl)ethyltriethoxysilane.

For example, the second polymeric layer may comprise or consist of a blend of a polar polymer and a silane having at least one alkyl group having at least 6 carbon atoms. For example, the second polymeric layer may comprise >0.0 and ≤15.0 wt % of the silane, preferably ≥0.5 and ≤15.0 wt %, or ≥0.5 and ≤10.0 wt %, or ≥0.5 and ≤8.0 wt %, or ≥0.5 and ≤5.0 wt %, with regard to the total weight of the second polymeric layer. For example, the second polymeric layer may comprise ≥0.5 and ≤8.0 wt %, preferably ≥0.5 and ≤5.0 wt %, of the silane.

For example, the second polymeric layer may consist of a blend of a polar polymer and >0.0 and ≤15.0 wt %, preferably ≥0.5 and ≤8.0 wt %, more preferably ≥0.5 and ≤5.0 wt %, of a silane having at least one alkyl group having at least 6 carbon atoms, with regard to the total weight of the second layer. The alkyl group having at least 6 carbon atoms may for example be an alkyl group comprising 6-20 carbon atoms, preferably 6-12 carbon atoms, more preferably 6-10 carbon atoms. The alkyl group having at least 6 carbon moieties may for example be a hexyl moiety, a cyclohexyl moiety, an octyl moiety, a decyl moiety, a dodecyl moiety, a tetradecyl moiety, a hexadecyl moiety, an octadecyl moiety, or an eicosyl moiety. For example, the alkyl group having at least 6 carbon moieties may for example be a hexyl moiety, a cyclohexyl moiety, an octyl moiety, or a decyl moiety.

It is preferred that the silane comprises at least one alkoxy moiety comprising 1-6 carbon atoms. For example, the silane may comprise one, two or three alkoxy moieties comprising 1-6 carbon atoms. For example, such alkoxy moieties comprising 1-6 carbon atoms may be selected from methoxy, ethoxy, and propoxy moieties. For example, the silane may comprise one, two or three methoxy moieties. For example, the silane may comprise one, two or three ethoxy moieties.

For example, the silane may comprise one or more alkyl moieties comprising 1-4 carbon atoms. For example, the silane may comprise one or more methyl, ethyl, propyl or butyl moieties. For example, the silane may comprise one or more methyl moieties. For example, the silane may comprise one or two methyl moieties.

For example, the silane may comprise:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii).

For example, the silane may comprise:
(i) one alkyl group having at least 6 carbon atoms, selected from a hexyl, cyclohexyl, octyl or decyl moiety;
(ii) one or two alkoxy moiety comprising 1-6 carbon atoms, selected from one or two methoxy or ethoxy moieties; and
(iii) one or two alkyl moieties comprising 1-4 carbon atoms, selected from one or two methyl moieties;
wherein the silane comprises a total of four moieties selected from (i), (ii) and (iii).

Silylated polar polymer can be a reaction product of the silane and a polar olefinic monomer (e.g., EVOH, or PVOH). In some embodiments, the silane is melt blended with a polar polymer. The silylated polar polymer can include units from the polar olefinic monomer and silyl units. In some embodiments, the silylated polar polymer can have the general structure of:

where x is 20 to 60, y is 40 to 80 n is 1 to 3, and z is 1 to 5.

In addition, the silylated polymer can include units derived from other monomers. Non-limiting examples of other monomers include ethylene propylene, acrylic or methacrylic acid esters, or combinations thereof. Non-limiting examples of acrylic or methacrylic acid esters include, methyl acrylate or ethyl methacrylate, vinyl acetate, styrene, or derivatives thereof. There is no particular restriction upon the nature of the silylated ethylene vinyl alcohol used in the present invention, other than that it should be appropriate to the intended use of the second layer (i.e., a gas barrier layer), and it can be any ethylene vinyl alcohol having a silicon atom in the molecule.

The silylated polar polymer can be produced by melt blending a polymeric polar polymer (e.g., EVOH) with a silane described above (i.e., a silane having at least one alkyl group having a carbon number of at least 6). In one of the preferred embodiments, the polymeric EVOH is EVAL™ G156B grade, supplied by Kuraray Co., Ltd. (Japan). In a more preferred embodiment, polymeric EVOH is melt blended with, dimethoxymethyl octyl silane. By way of example and as exemplified in a non-limiting manner in the Examples, the melt blending of the polar polymer and a silane in a ratio of 90:10 weight percentage, preferably 95:5 weight percentage and mostly preferably, 98:2 weight percentage can be done in a twin-screw extruder fitted with 6 or 10 barrels. The screw speed can range from 200 to 300, or about 250 RPM. A feed-rate can be of 6 to 10 kg/h or about 6.5 Kg/h. The temperature profile of the barrels can increase incrementally as the material flow from one barrel to another barrel. The temperature can range from 130 to 250° C., or about 140 to 220° C. It should be understood that the speed, flow and temperature profile can be varied as equipment and conditions require.

The second polymeric layer may for example comprise a blend of a polar polymer and the silane. The polar polymer may for example be a polyvinyl alcohol (PVOH), an ethyl vinyl alcohol (EVOH), a polyamide, a polyvinylidene chloride (PVDC), or copolymers thereof, or blends thereof. Preferably, the polar polymer is EVOH. It is to be understood that the EVOH may be a copolymer comprising or consisting of moieties derived from ethylene and moieties derived from vinyl alcohol. The EVOH may for example comprise ≥20.0 and ≤80.0 wt % of moieties derived from ethylene, preferably ≥30.0 and ≤70.0 wt %, more preferably ≥40.0 and ≤60.0 wt %, with regard to the total weight of the EVOH. The EVOH may for example consist of moieties derived from vinyl alcohol and ≥20.0 and ≤80.0 wt % of moieties derived from ethylene, preferably ≥30.0 and ≤70.0 wt %, more preferably ≥40.0 and ≤60.0 wt %, with regard to the total weight of the EVOH.

Silylated polar polymers can also be made by: silylating an ethylene vinyl alcohol or a modified ethylene vinyl acetate which contains hydroxy and/or carboxy groups; saponifying a copolymer of an ethylene vinyl ester and an olefinically unsaturated monomer containing silyl groups; or saponifying an ethylene vinyl ester having a terminal silyl group(s), which may be obtained by polymerizing a vinyl ester in the presence of a silyl mercaptan. The silylated polar polymer can also be prepared by the condensation reaction of ethylene vinyl alcohol (or a precursor thereof) with a silyl group-containing monomer, such as octyldimethoxymethylsilane.

The second polymeric layer can have an oxygen transmission rate (OTR) of 0.1 to 30 cc/m$^2$/day at 0% relative humidity and room temperature (e.g., 20° C. to 30° C.). The second polymeric layer can have an oxygen transmission rate (OTR) of 1 to 50 cc/m$^2$/day or at least, equal to, or between any two of 1, 5, 10, 15, 20, 25, 30, 35, 40, 45, and 50 cc/m$^2$/day at 75% to 100% relative humidity and room temperature. The second polymeric layer can have a water contact angle of 90 to 110 degrees, or at least, equal to, or between any two of 90, 91, 92, 93, 94, 95, 96, 97, 98, 99, 100, 101, 102, 103, 104, 105, 106, 107, 108, 109, and 110 degrees.

3. Adherent Layer

In some embodiments, multilayer film 20 can include an adherent layer. The adherent layer can be used to improve the adhesion between the second polymeric layer and the polyolefin polymer-based layer. Non-limiting examples of adherents include maleic anhydride grafted polyethylene, maleic anhydride grafted polypropylene, ethylene vinyl acetate, polypropylene-polyethylene terephthalate blends, acrylics, nitriles, modified silicone rubbers, styrene-butadiene-styrene copolymers, styrene-ethylene/butylene-styrene copolymers, styrene-ethylene/propylene copolymers, styrene-isoprene-styrene copolymers, a combination thereof, or blend thereof. In a preferred instance, maleic anhydride grafted polyethylene is used. In another embodiment, no adhesives are used. In some embodiments, the adherent is mixed with other additives including antioxidants, heat stabilizers, flow modifiers, colorants, etc., or any combinations thereof. Adherents and other additives are available from commercial chemical suppliers such as, for example, SigmaMillipore (U.S.A.), ExxonMobil Chemical (U.S.A.), LyondellBassell (U.S.A.), BASF (Germany) and the like.

3. Additives

Each of the layers in the multilayer films of the present invention can include an additive or multiple additives. For example, each layer in the multilayer film can include an amount of additives of 0 and 20 wt. %, preferably >0 and <20 wt. % or between 0.5 wt. % and <20 wt. %, further preferred between 0.5 to 15 wt. %, further preferred between 0.5 to 12 wt. % or between 0.5 to 8 wt. % based on the total weight of the layer, wherein the sum of the polymer(s) and the additives may preferably be 100 wt. % based on the total weight of the layer.

Non-limiting examples of additives that can be used in any of the layers of the multilayer films of the present invention can include anti-fogging agents (e.g., a glycerol ester), an antioxidant, a heat stabilizer, a hindered amine light stabilizer, a flow modifier, an UV absorber, an impact modifier, a coupling agent, a colorant, etc., or any combinations thereof.

Coupling agents can include maleic anhydride grafted polyethylene, maleic anhydride grafted polypropylene, or a combination that includes at least one of the foregoing. Non-limiting examples of commercially available coupling agents include Polybond® 3150 maleic anhydride grafted polypropylene from Chemtura (U.S.A.), Fusabond® P613 maleic anhydride grafted polypropylene, from DuPont (U.S.A.), and Priex® 20097 maleic anhydride grafter polypropylene homopolymer from Addcomp (Germany). The polymeric matrix can include, based on the total weight of the polymeric matrix, 0.1 to 5 wt. % coupling agent or greater than or substantially equal to any one of, or between any two of 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 wt. % of coupling agent.

Non-limiting examples of antioxidants include sterically hindered phenolic compounds, aromatic amines, a phosphite compound, carbon black and the like. Non-limiting examples of phenolic antioxidants include 2,6-di-tert-butyl-4-methylphenol (CAS No. 128-37-0), pentaerythritol-tetrakis(3-(3,5-di-tert-butyl-4-hydroxyphenyl)propionate (CAS No. 6683-19-8), octadecyl 3-(3',5'-di-tert-butyl-4-hydroxyphenyl)propionate (CAS No. 2082-79-3), 1,3,5-trimethyl-2,4,6-tris-(3,5-di-tert-butyl-4-hydroxybenzyl)benzene (CAS No. 1709-70-2), 2,2'-thiodiethylenebis(3,5-di-tert-butyl-4-hydroxyphenyl)propionate (CAS No. 41484-35-9), calcium bis(ethyl 3,5-di-tert-butyl-4-hydroxybenzylphosphonate) (CAS No. 65140-91-2), 1,3,5-tris(3',5'-di-tert-butyl-4'-hydroxybenzyl)-isocyanurate (CAS No. 27676-62-6), 1,3,5-tris(4-tert-butyl-3-hydroxy-2,6-dimethylbenzyl)-1,3,5-triazine-2,4,6-(1H,3H,5H)-trione (CAS No. 40601-76-1), 3,3-bis (3-tert-butyl-4-hydroxyphenyl)ethylene butyrate (CAS No. 32509-66-3), 4,4'-thiobis(2-tert-butyl-5-methylphenol) (CAS No. 96-69-5), 2,2'-methylene-bis-(6-(1-methyl-cyclohexyl)-para-cresol) (CAS No. 77-62-3), 3,3'-bis(3,5-di-tert-butyl-4-hydroxyphenyl)-N,N'-hexamethylenedipropionamide (CAS No. 23128-74-7), 2,5,7,8-tetramethyl-2-(4',8',12'-trimethyltridecyl)-chroman-6-ol (CAS No. 10191-41-0), 2,2-ethylidenebis(4,6-di-tert-butylphenol) (CAS No. 35958-30-6), 1,1,3-tris(2-methyl-4-hydroxy-5'-tert-butylphenyl) butane (CAS No. 1843-03-4), 3,9-bis(1,1-dimethyl-2-(beta-(3-tert-butyl-4-hydroxy-5-methylphenyl)propionyloxy) ethyl)-2,4,8,10-tetraoxaspiro[5.5]undecane (CAS No. 90498-90-1), 1,6-hexanediyl-bis(3,5-bis(1,1-dimethylethyl)-4-hydroxybenzene)propanoate) (CAS No. 35074-77-2), 2,6-di-tert-butyl-4-nonylphenol (CAS No. 4306-88-1), 4,4'-butylidenebis(6-tert-butyl-3-methylphenol (CAS No. 85-60-9); 2,2'-methylene bis(6-tert-butyl-4-methylphenol) (CAS No. 119-47-1), triethylenglycol-bis-(3-tert-butyl-4-hydroxy-5-methylphenyl)propionate (CAS No. 36443-68-2), a mixture of $C_{13}$ to $C_{15}$ linear and branched alkyl esters of 3-(3',5'-di-tert-butyl-4'-hydroxyphenyl)propionic acid (CAS No. 171090-93-0), 2,2'-thiobis(6-tert-butyl-para-cresol) (CAS No. 90-66-4), diethyl-(3,5-di-tert-butyl-4-hydroxybenzyl)phosphate (CAS No. 976-56-7), 4,6-bis (octyl-thiomethyl)-ortho-cresol (CAS No. 110553-27-0), benzenepropanoic acid, octyl 3-(3,5-di-tert-butyl-4-hydroxyphenyl)propanoate (CAS No. 125643-61-0), 1,1,3-tris [2-methyl-4-[3-(3,5-di-tert-butyl-4-hydroxyphenyl)propionyloxy]-5-tert-butylphenyl]butane (CAS No. 180002-86-2), mixed styrenated phenols (CAS No. 61788-44-1), butylated, octylated phenols (CAS No. 68610-06-0), butylated reaction product of p-cresol and dicyclopentadiene (CAS No. 68610-51-5).

Non-limiting examples of phosphite antioxidant include one of tris(2,4-di-tert-butylphenyl)phosphite (CAS No. 31570-04-4), tris(2,4-di-tert-butylphenyl)phosphate (CAS No. 95906-11-9), bis(2,4-di-tert-butylphenyl)pentaerythritol diphosphite (CAS No. 26741-53-7); and tetrakis (2,4-di-butylphenyl)-4,4'-biphenylene diphosphonite (CAS No. 119345-01-6), and bis (2,4-dicumylphenyl)pentaerythritol diphosphite (CAS No. 154862-43-8).

Non-limiting examples of UV stabilizers include hindered amine light stabilizers, hydroxybenzophenones, hydroxyphenyl benzotriazoles, cyanoacrylates, oxanilides, hydroxyphenyl triazines, and combinations thereof. Non-limiting examples of hindered amine light stabilizers include dimethyl succinate polymer with 4-hydroxy-2,2,6,6-tetramethyl-1-piperidine ethanol (CAS No. 65447-77-0); poly[[6-((1,1,3,3-tetramethylbutyl)amino)-1,3,5-triazine2,4diyl][(2,2,6,6-tetramethyl-4-piperidyl)imino]hexamethylene[2,2,6,6-tetramethyl-4-piperidyl)imino]] (CAS No. 70624-18-9); and 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane (CAS No. 106990-43-6).

Non-limiting examples of heat stabilizers include phenothiazine, p-methoxyphenol, cresol, benzhydrol, 2-methoxy-p-hydroquinone, 2,5-di-tert-butylquinone, diisopropylamine, and distearyl thiodipropionate (CAS No. 693-36-7). In a preferred embodiment, distearyl thiodipropionate which is sold under the trade name Irganox® PS 820 (BASF, Germany) is used.

Non-limiting examples of antioxidants include a mixture of at least two of 1,3,5-trimethyl-2,4,6-tris-(3,5-di-tert-butyl-4-hydroxybenzyl) benzene sold under the trade name of Irganox® 1330 (BASF, Germany), tris[2,4-bis(2-methyl-2-propanyl)phenyl] phosphite sold under the trade name of Irgafos® 168 (BASF, Germany), pentaerythritol-tetrakis (3-(3,5-di-tert-butyl-4-hydroxyphenyl) propionate sold under the trade name Irganox® 1010 (BASF, Germany), 1,5,8,12-Tetrakis[4,6-bis(N-butyl-N-1,2,2,6,6-pentamethyl-4-piperidylamino)-1,3,5-triazin-2-yl]-1,5,8,12-tetraazadodecane sold under the trade name of Chimassorb 119 (BASF, Germany) is used.

Other additives can include stabilizers, UV absorbers, impact modifiers, and cross-linking agents. A non-limiting example of a stabilizer can include Irganox® B225, commercially available from BASF. In a still further aspect, neat polypropylene can be introduced as an optional additive. Non-limiting examples of UV absorbers include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, or combinations thereof. Non-limiting examples of impact modifiers include elastomers/soft blocks dissolved in matrix-forming monomer(s), such as, for example, bulk HIPS, bulk ABS, reactor modified PP, Lomod, Lexan EXL, and/or the like, thermoplastic elastomers dispersed in matrix material by compounding, such as, for example, di-, tri-, and multiblock copolymers, (functionalized) olefin (co)polymers, and/or the like, pre-defined core-shell (substrate-graft) particles distributed in matrix material by compounding, such as, for example, MBS, ABS-HRG, AA, ASA-XTW, SWIM, and/or the like, or combinations thereof. Non-limiting examples of cross-linking agents include divinylbenzene, benzoyl peroxide, alkylenediol di(meth)acrylates, such as, for example, glycol bisacrylate and/or the like, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, or combinations thereof.

B. Method of Making Multilayer Films

The multilayer films of the present invention may be prepared by any method known in the art. Non-limiting examples include co-extrusion, film extrusion, compression molding, lamination, injection molding, blow molding, or thin-walled injection molding techniques. In one particular instance, multilayer films may be prepared for example by a blown film co-extrusion process, for example as disclosed in "Film Extrusion Manual", (TAPPI PRESS, 2005, ISBN 1-59510-075-X, Editor Butler, pages 413-435).

For example, in the process of co-extrusion, the various resins that form the first and second layers (and third, fourth, fifth, and more layers) discussed throughout this specification may be first melted in separate extruders and then brought together in a feed block. The feed block is a series of flow channels which bring the layers together into a uniform stream. From this feed block, this multilayer material then flows through an adapter and out a film die. The blown film die may be an annular die. The die diameter may be a few centimeters to more than three meters across. The molten plastic is pulled upwards from the die by a pair of nip rolls high above the die (from for example 4 meters to more than 20 meters). Changing the speed of these nip rollers will change the gauge (wall thickness) of the film. Around the die an air-ring may be provided. The air exiting the air-ring cools the film as it travels upwards. In the center of the die there may be an air outlet from which compressed air can be forced into the center of the extruded circular profile, creating a bubble. This expands the extruded circular cross section by some ratio (a multiple of the die diameter). This ratio, called the "blow-up ratio" can be just a few percent to for example more than 300 percent of the original diameter. The nip rolls flatten the bubble into a double layer of film whose width (called the "layflat") is equal to ½ of the circumference of the bubble. This film may then be spooled or printed on, cut into shapes, and heat sealed into bags or other items. It is further noted that the invention relates to all possible combinations of features described herein, preferred in particular are those combinations of features that are present in the claims.

C. Use of Multilayer Films

The multilayer films of the present invention may be used in the production of packaging materials. Examples of preferred materials include films and/or pouches, especially for applications such as food and/or beverage packaging applications, for health care applications, and/or pharmaceutical applications, and/or medical or biomedical applications. The multilayer films can be in direct contact with an item intended for human or animal use, such as for example a beverage, a food item, a medicine, an implant, a patch or another item for nutritional and/or medical or biomedical use.

In a certain embodiment, the present invention relates to a multilayer film comprising:

(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the polyolefin-based polymer is an LLDPE having a density of ≥900 and ≤925 kg/m$^3$, as determined in accordance with ASTM D792 (2013).

In another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, and wherein the second polymeric layer comprises ≥0.5 and ≤8.0 wt %, preferably ≥0.5 and ≤5.0 wt %, of the silane.

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, and wherein the silane comprises:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii).

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, wherein the second polymeric layer comprises ≥0.5 and ≤8.0 wt %, preferably ≥0.5 and ≤5.0 wt %, of the silane, and wherein the silane comprises:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii).

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, wherein the second polymeric layer comprises ≥0.5 and ≤8.0 wt %, preferably ≥0.5 and ≤5.0 wt %, of the silane, and wherein the silane comprises:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii); and
wherein the polar polymer is an ethylene-vinyl alcohol copolymer (EVOH), preferably comprising ≥30.0 and ≤70.0 wt % of moieties derived from ethylene, with regard to the total weight of the EVOH.

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, wherein the second polymeric layer comprises ≥0.5 and ≤8.0 wt %, preferably ≥0.5 and ≤5.0 wt %, of the silane, and wherein the silane comprises:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii); and
wherein the polyolefin-based polymer is an LLDPE having a density of ≥900 and ≤925 kg/m$^3$, as determined in accordance with ASTM D792 (2013).

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);

wherein the silicon containing material is the silane, wherein the second polymeric layer comprises ≥0.5 and ≤8.0 wt %, preferably ≥0.5 and ≤5.0 wt %, of the silane, and wherein the silane comprises:
(i) one alkyl group having at least 6 carbon atoms, preferably 6-12 carbon atoms;
(ii) one or two alkoxy moiety comprising 1-6 carbon atoms, preferably one or two methoxy or ethoxy moieties; and
(iii) one or two alkyl moieties comprising 1-4 carbon atoms, preferably one or two methyl moieties;
wherein the silane comprises a total of four moieties selected from (i), (ii) and (iii);
wherein the polyolefin-based polymer is an LLDPE having a density of ≥900 and ≤925 kg/m$^3$, as determined in accordance with ASTM D792 (2013); and wherein the polar polymer is an ethylene-vinyl alcohol copolymer (EVOH), preferably comprising ≥30.0 and ≤70.0 wt % of moieties derived from ethylene, with regard to the total weight of the EVOH.

In yet another certain embodiment, the present invention relates to a multilayer film comprising:
(a) at least a first polymeric layer comprising a polyolefin-based polymer; and
(b) a second polymeric layer comprising a blend of a polar polymer and a silicon (Si) containing material comprising a silane having at least one alkyl group having at least 6 carbon atoms (C6);
wherein the silicon containing material is the silane, wherein the second polymeric layer comprises ≥0.5 and ≤8.0 wt %, preferably ≥0.5 and ≤5.0 wt %, of the silane, wherein the silane is selected from dimethoxymethyloctylsilane, dimethoxymethyldecylsilane, and cyclohexyl dimethoxymethyl silane,
wherein the polyolefin-based polymer is an LLDPE having a density of ≥900 and ≤925 kg/m³, as determined in accordance with ASTM D792 (2013); and
wherein the polar polymer is an ethylene-vinyl alcohol copolymer (EVOH), preferably comprising ≥30.0 and ≤70.0 wt % of moieties derived from ethylene, with regard to the total weight of the EVOH.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Melt Blending of EVOH and Silane

EVOH used is EVAL™ G156B received from Kuraray. EVAL G156B contains 48% of ethylene and has a MFR value of ~6.4 g/10 min at 190° C. with 2.16 Kg load, a density of 1.12×103 Kg/m3, a glass transition temperature of 50° C. and a melting temperature of 157° C.). The silane used is dimethoxymethyloctylsilane (CAS No. 85712-15-8) received from Sigma-Aldrich and is in liquid form and used as received without any purification. Required ratio of EVOH (dried at 120° C. for 12 hours) and silane are weighed and physically blended with a mixture of powdered and pellets of EVOH in a plastic bag. Feed ratio of EVOH to silane was 95:5. The mixture was subsequently fed into a twin screw extruder (Coprion ZSK 25) equipped with 10 barrels which were maintained at the temperatures listed in Table 1. The other processing conditions were screw speed of 250 RPM and feed-rate of 6.5 Kg/h. The torque observed while melt extruding neat EVOH and a mixture of EVOH and silane were in the range of 48-54%, indicating that there was no processing issues with the incorporation of silane with EVOH. The extruded strands were cut into pellets which are subsequently used for making thin films by compression molding.

TABLE 1

| Barrel Number | 1 | 2 | 3 | 4 | 5 | 6 | 7 | 8 | 9 | 10 |
|---|---|---|---|---|---|---|---|---|---|---|
| Temperature (° C.) | 140 | 185 | 190 | 200 | 210 | 215 | 220 | 220 | 220 | 220 |

Example 2

Compression Molding of the Melt Blended EVOH and Silane

The melt blended EVOH and silane of Example 1 was made into a thin film using compression molding. The molding platen (both upper and bottom) temperature was 210° C., holding pressure was about 80 bar (8.0 MPa), holding time was 5 minutes, and cooling time was 5 minutes. The produced film had an average thickness of 200 microns.

Example 3

Characterization of Melt Blended EVOH and Silane

The film of Example 2 was analyzed and tested, with the results shown in items (i) through (ix).
(i) Compositional analyses: the composition was inferred by NMR (Nuclear Magnetic Resonance) spectral analyses of cut piece of compression molded film (10 mg) dissolved in DMSO-d6. Modified EVOH compositions containing 1, 3, 5 and 10 weight percentages of alkyl silane were made.
(ii) TGA (Thermogravimetric analyses, heating rate: 20° C./min, atmosphere: air/nitrogen; method: ASTM E1131), as % weight loss at 220° C.
(iii) MFR (melt flow rate, load: 2.16 Kg, temperature: 190° C., dwell time: 300 sec, method: ISO1133-1)
(iv) WCA (water contact angle, sessile drop technique, instrument: KRUS drop shape analyzer DSA-100S)
(v) OTR (oxygen transmission rate, thickness: about 200 micron; temperature: 23° C.; permeant concentration: 100%; relative humidity: 0%; area of sample exposed: 5 cm²)
(vi) Humidity exposure conditions: relative humidity: 75%; time: 48 hours; temperature: 23° C.
(vii) OTR of films made with a blend of EVOH-alkyl silane (EVOH:alkyl silane ratio of 97:3 to 90:10), after exposing to high humid conditions, in cc/m²/day (
(viii) XRD (X-ray diffraction): increase of crystallinity, as compared to neat EVOH.

|  | Example EVOH | 3A | 3B | 3C | 3D |
|---|---|---|---|---|---|
| Silane content (wt %) | 0 | 1 | 3 | 5 | 10 |
| TGA |  | <1 | <1 | <1 | 2-3 |
| MFR | 7.0 | 7.2 | 7.9 | 8.3 | 9.5 |
| WCA | 85-89 | 90-93 | 96-104 | 100-107 | 105-110 |
| OTR | 28.5 | 15 | 7 | 7 | 7 |
| OTR after exposing | >500 | >500 | 19 | 19 | 19 |
| XRD increase | — | Ca. 2-5 | Ca. 12 | Ca. 12 | Ca. 12 |

Example 4

Multilayer Fabrication and Characterization

The multilayer blown film extrusion was carried out with a 5 layer blown film extruder (Labtech coex LF400). Different multilayer films prepared include, A. 5 layer multilayer film consisting of 20 micron LLDPE (118NE)/3 micron maleic anhydride grafted polyethylene/5 micron EVOH (EVAL™ G156B)/3 micron maleic anhydride grafted polyethylene/20 micron LLDPE (118NE)

B. 5 layer multilayer film consisting of 20 micron LLDPE (118NE)/3 micron maleic anhydride grafted polyethylene/5 micron 98:2 blend of EVOH (EVAL™ G156B) and dimethoxymnethyloctylsilane/3 micron maleic anhydride grafted polyethylene/20 micron LLDPE (118NE)

C. 3 layer multilayer film consisting of 20 micron LLDPE (118NE)/5 micron 98:2 blend of EVOH (EVAL™ G156B) and dimethoxymethyloctylsilane/20 micron LLDPE (118NE)

D. 3 layer multilayer film consisting of 15 micron LLDPE (118NE)/3 micron 98:2 blend of EVOH (EVAL™ G156B) and dimethoxymethyloctylsilane/15 micron LLDPE (118NE)

| Multilayer film Code | OTR (in cc/m2/-day) before exposure to 100% RH and 40° C. for 48 h | OTR (in cc/m2/-day) after exposure to 100% RH and 40° C. for 48 h |
| --- | --- | --- |
| A | 27 | 40 |
| B | 27 | 30 |
| C | 40 | 40 |
| D | 105 | 105 |

The multilayer films consisting of a mixture of EVOH and alkyl silane (B, C and D) as gas barrier layer retains their barrier performance when exposed to high humid and high temperature conditions, in comparison to the multilayer film which consists of neat EVOH as a gas barrier layer. The observed deterioration of barrier performance upon exposure to high humid and high temperature conditions in multilayer film is less severe, as compared to that observed with neat EVOH film, due to the presence of moisture protective LLDPE layers on both side of EVOH layer in the multilayer film.

The invention claimed is:

1. A multilayer film comprising:
   (a) at least a first polymeric layer comprising a polyolefin-based polymer; and
   (b) a second polymeric layer comprising a blend of a polar polymer and a silicon (Si) containing material comprising a silane having at least one alkyl group having at least 6 carbon atoms (C6),
   wherein the at least one alkyl group having at least 6 carbon atoms is 1-hexyl, 2-hexyl, 3-hexyl, octyl, nonyl, decyl, undecyl, dodecyl, tridecyl, tetradecyl, pentadecyl, hexadecyl, heptadecyl, octadecyl, nonadecyl, or icosyl.

2. The multilayer film of claim 1, wherein at least a portion of the surface of the first polymeric layer is in direct contact with and attached to at least a portion of a surface of the second polymeric layer.

3. The multilayer film of claim 1, wherein an adherent layer is positioned between at least a portion of the first and second polymeric layers.

4. The multilayer film of claim 1, wherein the first polymeric layer has a non-plasma treated or non-corona treated surface.

5. The multilayer film of claim 1, wherein the Si containing material is a silane or an oligomeric silane, or a mixture of the silane(s) and a silylated polar polymer.

6. The multilayer film of claim 1, wherein the silane has a general formula of $SiR^1R^2R^3R^4$, where $R^1$ is the alkyl group having at least 6 carbon atoms, and $R^2$, $R^3$ and $R^4$ are each independently a C1 to C5 alkoxy group or alkyl group with the proviso that at least one of $R^2$, $R^3$ and $R^4$ is an alkoxy group.

7. A multilayer film comprising:
   (a) at least a first polymeric layer comprising a polyolefin-based polymer; and
   (b) a second polymeric layer comprising a blend of a polar polymer and a silicon (Si) containing material comprising a silane having at least one alkyl group having at least 6 carbon atoms (C6),
   wherein the silane is dimethoxymethyloctylsilane, dimethoxymethyloctadecylsilane, decyldimethoxymethylsilane, dodecyldimethoxymethylsilane, cyclohexyldimethoxymethylsilane, octyltrimethoxysilane, decyltrimethoxysilane, dodecyltrimethoxysilane, octadecyltrimethoxysilane, cyclohexyltrimethoxysilane, diethoxymethyloctadecylsilane, cyclohexyldiethoxymethylsilane, cyclohexyltriethoxysilane, octyltriethoxysilane, decyldiethoxymethylsilane, dodecyldiethoxymethylsilane, octadecyltriethoxysilane or decyltriethoxysilane.

8. The multilayer film of claim 1, wherein the second polymeric layer has a thickness of up to 10 micrometers.

9. The multilayer film of claim 1, wherein the second polymeric layer has an oxygen transmission rate (OTR) of 0.1 to 30 cc/m²/day at 0% relative humidity and room temperature, and/or an oxygen transmission rate (OTR) of 1 to 50 cc/m²/day at 75% to 100% relative humidity and room temperature.

10. The multilayer film of claim 1, wherein the second polymeric layer has water contact angle of 90 to 110 degrees.

11. The multilayer film of claim 1, further comprising a third polymeric layer comprising a polyolefin-based polymer,
   wherein the third polymeric layer is in direct contact with and attached to at least a portion of a surface of the second polymeric layer, and
   wherein at least a portion of the second polymeric layer is positioned between the first and third polymeric layers.

12. The multilayer film of claim 1, wherein the polar polymer in the second polymeric layer is a polyvinyl alcohol (PVOH), ethylvinyl alcohol (EVOH), polyamide (PA), polyvinylidene chloride (PVDC), or copolymers thereof, or blends thereof.

13. The multilayer film of claim 11, wherein the overall thickness of the multilayer film is 60 micrometers or less and/or wherein the first polymeric layer, the third polymeric layer, or both polymeric layers have a thickness of 10 micrometers to 30 micrometers.

14. The multilayer film of claim 11, wherein the first layer, third layer, or both comprise polyethylene that includes a high density polyethylene, a linear low density polyethylene, an ultra low density polyethylene, a maleic anhydride grafted polyolefin, copolymers thereof, or blends thereof.

15. A food-package comprising the multilayer film of claim 1.

16. The multilayer film of claim 11, wherein the first polymeric layer, the third polymeric layer, or both polymeric layers have a thickness of 15 micrometers to 25 micrometers each, and the second polymeric layer has a thickness of 2 micrometers to 10 micrometers.

17. The multilayer film of claim 16, wherein the second polymeric layer has a thickness of 3 micrometers to 6 micrometers.

18. The multilayer film of claim 11, wherein the first layer, third layer, or both comprise a polyethylene or maleic anhydride grafted polyethylene.

* * * * *